US007363875B2

(12) United States Patent
Vetesnik

(10) Patent No.: US 7,363,875 B2
(45) Date of Patent: Apr. 29, 2008

(54) OVERLOAD INDICATOR FOR A LOAD SUPPORTING APPARATUS

(75) Inventor: Jan Vetesnik, Winnipeg (CA)

(73) Assignee: Capital Safety Group Winnipeg Ltd., Winnipeg, Manitoba (CA)

( * ) Notice: Subject to any disclaimer, the term of this patent is extended or adjusted under 35 U.S.C. 154(b) by 0 days.

(21) Appl. No.: 11/283,413

(22) Filed: Nov. 21, 2005

(65) Prior Publication Data

US 2007/0113776 A1    May 24, 2007

(51) Int. Cl.
*G01L 5/00* (2006.01)
(52) U.S. Cl. ............... 116/212; 116/200; 116/DIG. 34
(58) Field of Classification Search ............... 116/212, 116/278, 200, 1, DIG. 1, DIG. 34, DIG. 32
See application file for complete search history.

(56) References Cited

U.S. PATENT DOCUMENTS

| 476,607 | A | * | 6/1892 | Caldwell | ............... 248/292.11 |
|---|---|---|---|---|---|
| 1,253,924 | A | * | 1/1918 | Barnett | ......................... 248/241 |
| 2,054,281 | A | * | 9/1936 | Chauncey | ................... 248/145 |
| 3,077,178 | A | * | 2/1963 | Gordon | ....................... 116/212 |
| 3,151,693 | A | * | 10/1964 | Chapman | .................... 177/234 |
| 3,757,967 | A | * | 9/1973 | Colbridge | ................... 211/191 |
| 3,760,963 | A | * | 9/1973 | Welch | ......................... 414/815 |
| 3,853,546 | A | * | 12/1974 | Werner et al. | .............. 116/212 |
| 3,934,918 | A | | 1/1976 | Kress et al. | |
| 4,090,399 | A | * | 5/1978 | Babcock | .............. 116/DIG. 34 |
| 5,103,755 | A | * | 4/1992 | Garrett | ....................... 116/200 |
| 5,199,688 | A | | 4/1993 | Engel | |
| 5,503,358 | A | * | 4/1996 | Lapp | .......................... 248/235 |
| 6,170,802 | B1 | | 1/2001 | Stovall | |
| 6,571,398 | B2 | * | 6/2003 | Stahl et al. | ................... 33/333 |
| 6,830,423 | B1 | | 12/2004 | Williams et al. | |

* cited by examiner

*Primary Examiner*—Richard Smith
*Assistant Examiner*—Tania C Courson
(74) *Attorney, Agent, or Firm*—IPLM Group, P.A.

(57) ABSTRACT

An overload indicator for a load supporting apparatus is arranged to bend during overloading of the apparatus, thereby visually indicating the overload to a user or observer. The indicator features a longitudinal member having a U-shaped cross section defining one central and two side portions. A series of slots extend into each side portion from a side opposite the central portion such that the member will bend concavely with respect to that side, moving opposite ends of the member closer together. The indicator is arranged to extend between connection points on a first member and a second load supporting member of the apparatus in order to bend in response to excessive loading of the second member. The bending moves the connection points of the two members closer together, thus bringing the load closer to the first member.

25 Claims, 6 Drawing Sheets

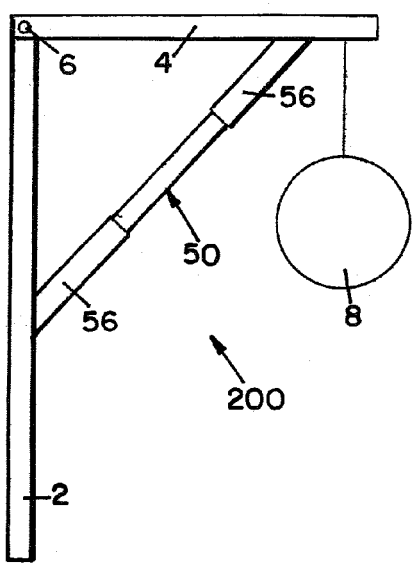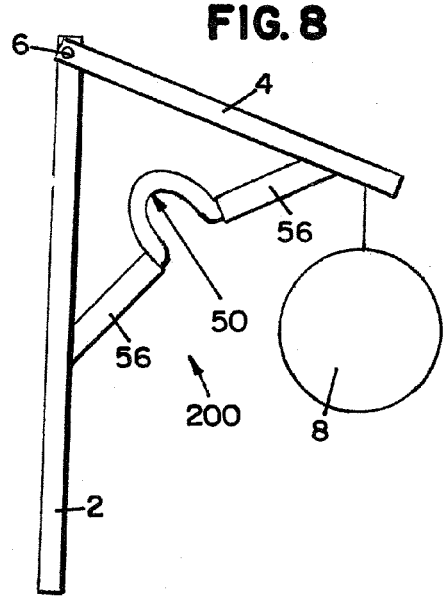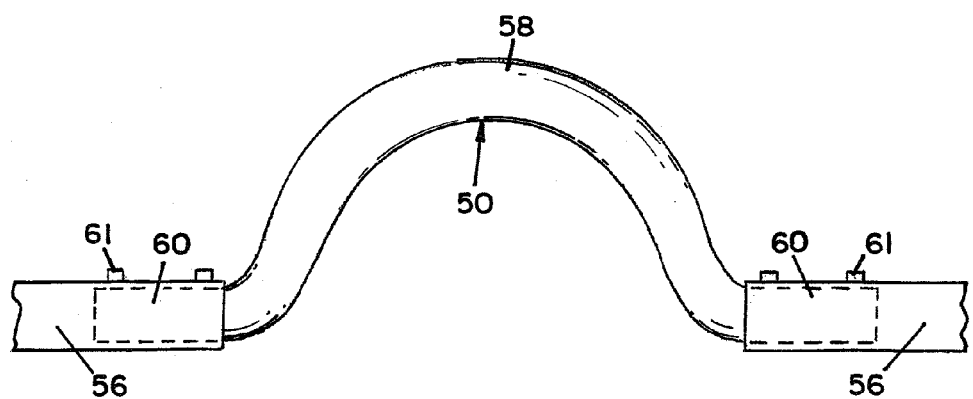

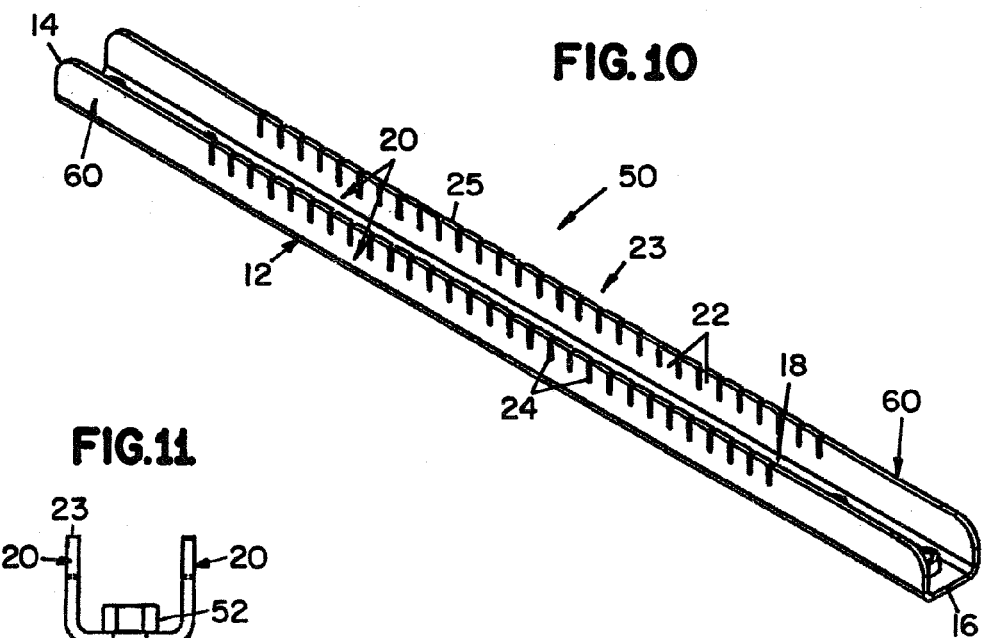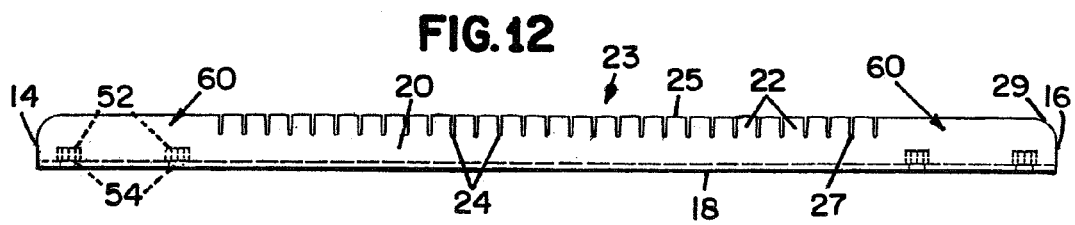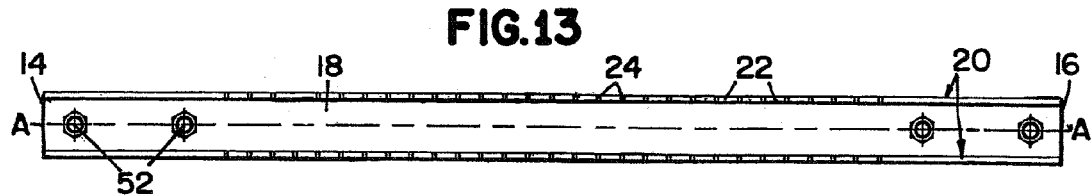

OVERLOAD INDICATOR FOR A LOAD SUPPORTING APPARATUS

This invention relates to an overload indicator which visually indicates the overloading of a load supporting apparatus by means of bending at loads exceeding a predetermined limit.

BACKGROUND OF THE INVENTION

The use of a load supporting apparatus such as a crane, jib, davit or fall protection system can be quite dangerous if used improperly. Death, injury and property damage can result from attempting to lift a load that exceeds the recommended loading range for which a particular apparatus was designed. Concerns over safety therefore create a desire for a device that can prevent accidents by providing an indication to a user or observer when a load supporting apparatus is being overloaded. Provided with such a warning, the user can unload the apparatus immediately in order to avert failure and resulting casualties. For cases where the load cannot be removed quickly and safely, it is also desirable to have a means to reduce the effect of the overloading and prevent substantial damage to the primary components of the apparatus.

SUMMARY OF THE INVENTION

According to an aspect of the invention there is provided an apparatus for supporting a load, said apparatus comprising:

a first member having a first connection point thereon;

a second member having a second connection point thereon, said second member being adapted to support the load and being supported on the first member; and an overload indicator comprising a longitudinal member having opposite ends spaced apart by a first distance, said overload indicator extending between the first and second connection points, thereby supporting the second member on the first member;

the connection points being points being spaced apart by a second distance;

the apparatus having a load limit;

the longitudinal member of the overload indicator being adapted to bend if the load exceeds the load limit of the apparatus such that the first distance between the opposite ends of said longitudinal member is decreased, thereby visually indicating overloading of the apparatus; and the second member being arranged to move during bending of the longitudinal member of the overload indicator such that the second distance between the first and second connection points is decreased.

The overload indicator of the load supporting apparatus is arranged to bend during overloading of the apparatus, thereby visually indicating the overload to a user or observer. The indicator is arranged to extend between connection points on a first member and a second load supporting member of the apparatus in order to bend in response to excessive loading of the second member. The bending action moves the opposite ends of the member closer together, thereby reducing the distance between the connection points of the two members. This brings the load supported by the second member closer to the first member.

Preferably the first member comprises a post extending upwardly from a lower end, the first connection point being upwardly spaced from said lower end.

Preferably the second member comprises a longitudinal support member supported on the post upward from the first connection point and extending to one side of said post.

Preferably the load is supported on the longitudinal support member at a loading point distally spaced from the post.

Preferably the second connection point is located between the post and the loading point.

In the case where the second member extends out to one side of the upward extending first member and supports the load at a distance therealong, bringing the load closer to the first member reduces the moment about the attachment point of the two members. This reduces wear and the likelihood of failure of the apparatus, thereby preventing accidents and keeping maintenance costs down, as only the overload indicator will need replacement.

The first member may further comprise a first mounting element supported on the post and extending toward the second connection point, the first connection point being located on said first mounting element. In this case, the second member may further comprise a second mounting element supported on the longitudinal support member and extending toward the first connection point, the second connection point being located on the second mounting element such that the overload indicator is supported between said first and second mounting elements.

Preferably the overload indicator further comprises a plurality of slots spaced along the longitudinal member between the opposite ends thereof, said slots extending into said longitudinal member from a first side thereof. The series of slots extending into the longitudinal member from one side weaken the member along that one side, thereby ensuring that the overload indicator will bend in a predetermined fashion. Specifically, the indicator will bend concavely with respect to that one side, moving the opposite ends of the member closer together.

Preferably the longitudinal member comprises a U-shaped cross section defining a central portion separating two spaced apart side portions, said side portions extending from the central portion toward the first side of the longitudinal member such that the plurality of slots are spaced along and extend into each of said side portions.

Preferably the slots in the side portions of the longitudinal member do not extend to the central section thereof.

According to a second aspect of the invention there is provided an apparatus for supporting a load, said apparatus comprising:

a first member having a first connection point thereon;

a second member having a second connection point thereon, said second member being adapted to support the load and being supported on the first member; and an overload indicator comprising:

a longitudinal member having opposite ends spaced apart by a first distance; and a plurality of slots spaced along the longitudinal member between the opposite ends thereof, said slots extending into said longitudinal member from a first side thereof;

said overload indicator extending between the first and second connection points, thereby supporting the second member on the first member;

the connection points being points being spaced apart by a second distance;

the slots of the overload indicator being arranged to cause the longitudinal member of said overload indicator to bend concavely with respect to the first side thereof during overloading of the apparatus such that the first distance between the opposite ends of said longitudinal member is decreased; and the second member being arranged to move during bending of the longitudinal member of the overload indicator such that the second distance between the first and second reference points is decreased.

According to a third aspect of the invention there is provided a device comprising:

a longitudinal channel member having opposite ends spaced apart and a U-shaped cross section defining opposite side portions spaced apart by a central portion; and a plurality of slots spaced along each side portion of the longitudinal channel member between the opposite ends thereof, said slots extending into said side portion from a first side of said longitudinal channel member, said first side being opposite the central portion;

the slots being arranged such that each slot has a respective slot on the opposite side portion that is generally equal in dimensions and is equally positioned along the longitudinal channel member; and each slot being of a length such that a distance is defined between said slot and the central portion of the longitudinal channel member.

BRIEF DESCRIPTION OF THE DRAWINGS

In the accompanying drawings, which illustrate exemplary embodiments of the present invention:

FIG. 7 is a side elevational view of another load supporting apparatus supporting a load less than its maximum recommended loading value.

FIG. 8 is an elevational view of the load supporting apparatus of FIG. 7 supporting a load greater than its maximum recommended loading value.

FIG. 9 is a close up view of the overload indicator and mounting elements of the apparatus of FIGS. 7 and 8 having been overloaded.

FIG. 10 is an isometric view of a second embodiment of the present invention.

FIG. 11 is an end view of the second embodiment of the present invention.

FIG. 12 is a side view of the second embodiment of the present invention.

FIG. 13 is a top plan view of second embodiment of the present invention.

DETAILED DESCRIPTION

Figure 1:
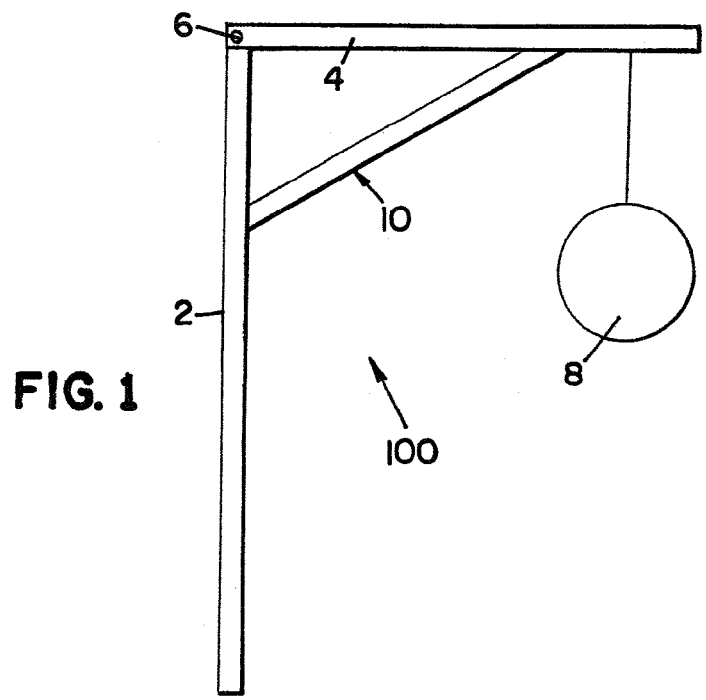
FIG. 1 is a side elevational view of a load supporting apparatus supporting a load less than its maximum recommended loading value.
Figure 2:
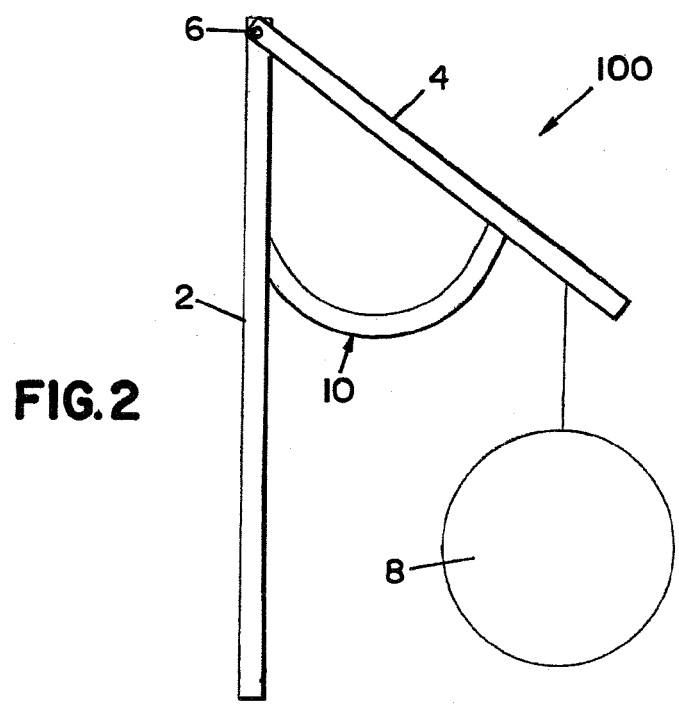
FIG. 2 is a side elevational view of the load supporting apparatus of FIG. 1 supporting a load greater than its maximum recommended loading value.

FIGS. 1 and 2 illustrate the general purpose of the overload indicator according to the present invention. In FIG. 1, a load supporting apparatus 100 features a first member 2 extending upward and having a second member 4 supported at the upper end and extending outward to one side. The two members are connected at an attachment point 6 featuring suitable fastening means that will resist moments of limited magnitude about that point. Such means are well known to those of skill in the art. Near a distal end of the second member 4 is supported a load 8 that is less than a maximum recommended loading value of the apparatus 100. The longitudinal overload indicator 10 extends angularly from the first member 2 at a point spaced downwardly from the second member 4 to a point on the second member 4 between the first member 2 and the load 8. In this arrangement, the overload indicator further supports the second member 4 relative to the first member 2.

FIG. 2 shows the same apparatus 100 wherein the load 8 exceeds the maximum recommended loading value. The overload indicator 10 is designed to undergo bending at loads exceeding this value such that it takes on the bow shape shown in the figure. This bending or bowing action serves to visually indicate to a user that the apparatus 100 has been overloaded and prevent damage to the first 2 and second 4 members that would otherwise be caused by the excessive load. When the user sees the overload indicator start to bend, he or she can respond to the visual feedback by removing the load to prevent further bending and possible accidents. In the case where the angle between the first 2 and second 4 members is 90 degrees or less before bending, the overload indicator 10 also serves to reduce the effect of the load on the apparatus 100 during exposure to overloading. When the overload indicator 10 bends as shown, the angle between the first 2 and second 4 members decreases, thereby moving the load 8 closer to the post 2. This reduces the magnitude of the moment induced about the attachment point 6 by the loading of the second member 4, increasing the effective resistance of the fastening means at this point 6 and thereby reducing the likelihood of further collapse of the apparatus 100.

Figure 3:
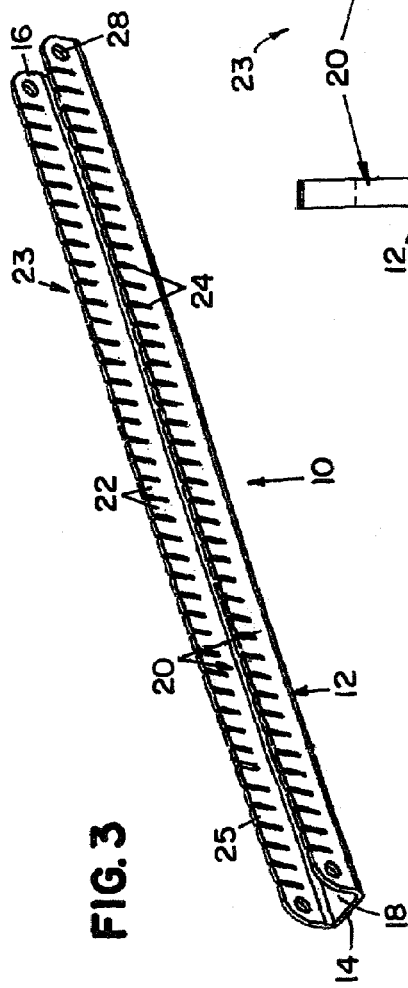
FIG. 3 is an isometric view of a first embodiment of the overload indicator according to the present invention.
Figure 4:
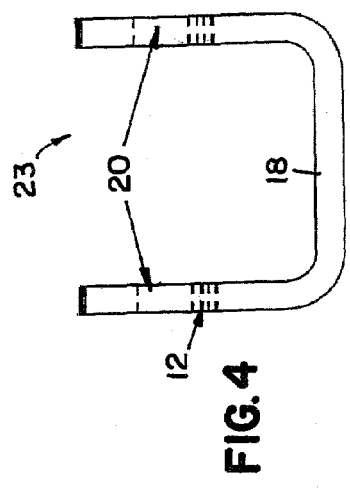
FIG. 4 is an end view of the first embodiment of the overload indicator according to the present invention.

A first embodiment of the overload indicator according to the present invention is shown in FIG. 3. The overload indicator 10 is made of a longitudinal member 12 having a U-shaped cross section as shown in FIG. 4. The U-shaped member 12 has a central portion 18 extending perpendicularly between parallel side portions 20. Between opposite ends 14 and 16, the longitudinal member 12 has a series of slots 24 extending from a side 23 opposite the central portion 18 toward the central portion 18 in each side portion 20. These slots 24 define teeth 22, each of which is positioned between two adjacent slots 24. At each of the ends 14 and 16, there is provided a pair of holes for mounting the overload indicator on an appropriate load supporting apparatus. A hole 28 is provided through each side portion 20 at each of the ends 14 and 16 for use as a connection point by means of which the overload indicator 10 can be installed for use in a load supporting apparatus.

The absence of material in the side portions 20 created by the slots 24 weakens the ability of these side portions 20 to resist compression loading along a longitudinal axis of the overload indicator 10. The central portion 18 however, remains intact as a solid piece having and thus has a greater strength than the side portions 20. As a result, longitudinal loading of the overload indicator 10 will tend to cause the longitudinal member 12 to bend, or bow, forming a concave curvature along the side 23 as the slots 24 close and the teeth 22 move together such that the overload indicator 10 takes on the general form shown in FIG. 2. With adjacent teeth 22 coming into contact, the strength of the overload indicator 10 is increased as the slots 24 close up. While weakened by the presence of the slots 24, it should be noted that the longitudinal member 12 will not bend under any longitudinal loading, but rather will only do so under excessive loading in which a predetermined limit is exceeded. The slot dimensions, slot spacing and longitudinal member material are all chosen so as to provide the overload indicator 10 with the appropriate bending characteristics for use in a specific load supporting apparatus having a particular loading limit. The overload indicator 10 therefore will only begin to bend when the apparatus has been loaded beyond the upper limit of its recommended load range, thereby indicating to a user that the apparatus has been overloaded.

Figure 5:
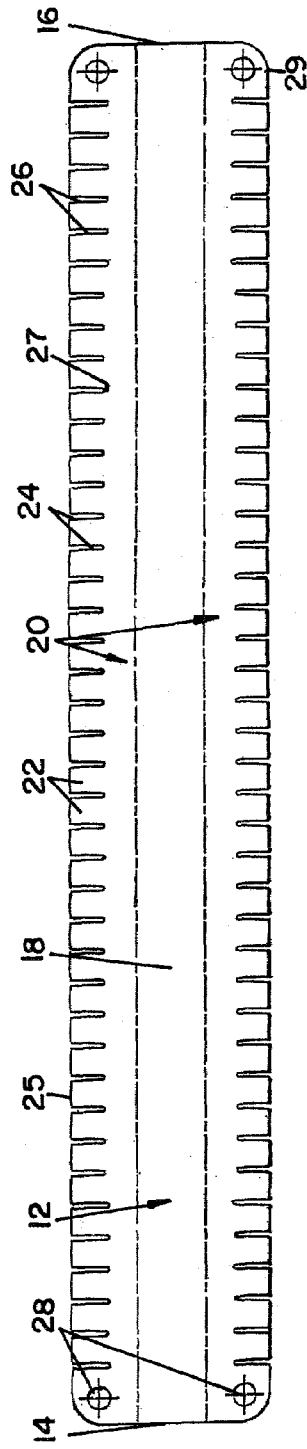
FIG. 5 is a top plan view of the first embodiment of the present invention at an intermediate stage of its manufacture.

FIG. 5 shows the overload indicator at an intermediate stage of its manufacture. Using dies, a 3/16" steel plate is formed having the two dimensional shape shown in the figure. In order to obtain the U-shaped cross section of the final product, as shown in FIG. 4, the side portions 20 are bent 90 degrees along the broken lines shown in FIG. 5. A series of six slots nearest each of the ends 14 and 16 of each side portion 20 is longer than the slots 24 between the two series of each side portion 20. Each tooth 22 is rounded at its outermost edge 25 opposite the central portion 18 between the respective pair of adjacent slots. Each slot 24 or 26 is tapered moving from the side 23 of the longitudinal member 12 toward the central portion 18, where it is rounded at its end 27, which is spaced from the central portion 18. Each corner 29 of the longitudinal member 12 is also rounded. As described above, the material and dimensions of the overload indicator 10 can be modified to alter the bending characteristics as needed.

Figure 6:
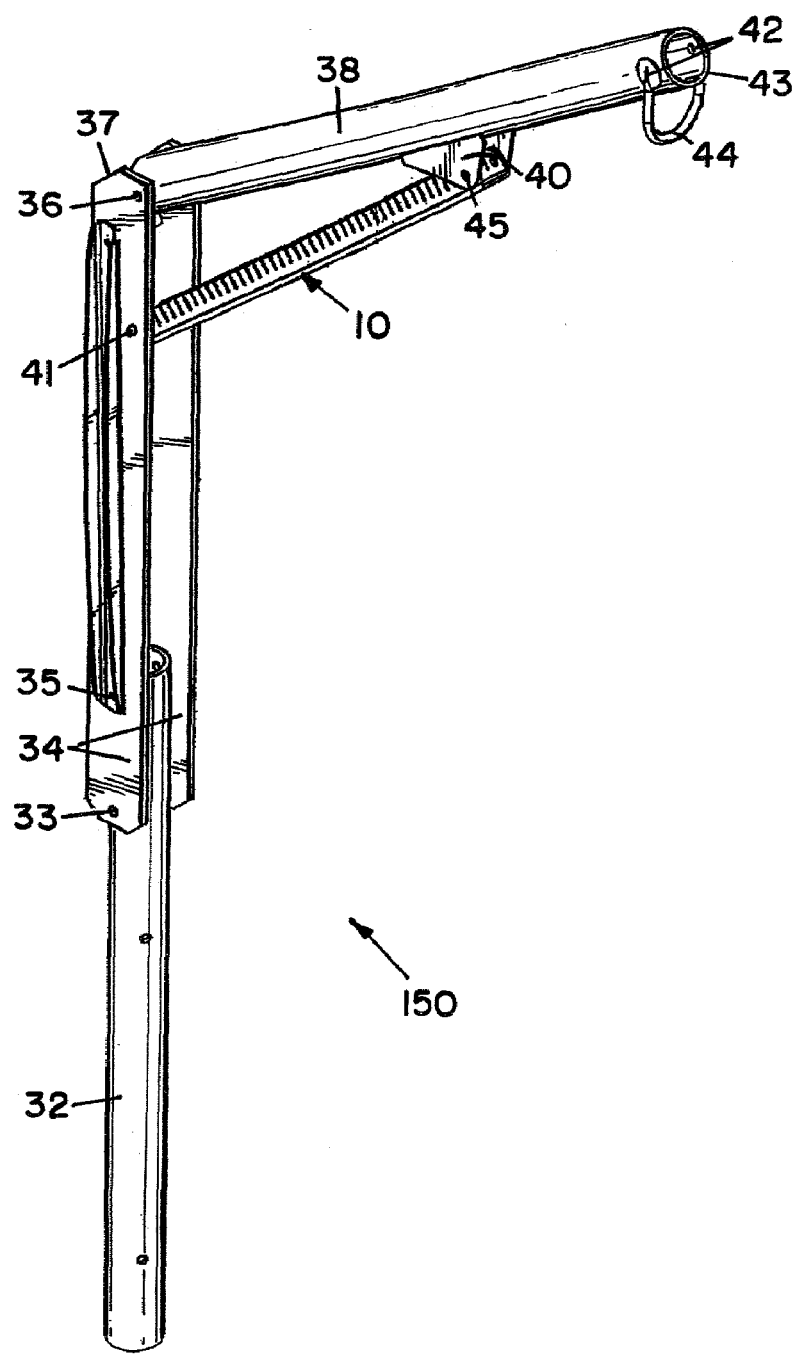
FIG. 6 is an isometric view of a davit assembly featuring an overload indicator according to the first embodiment of the present invention.

FIG. 6 illustrates a davit assembly 150 featuring the first embodiment of the overload indicator 10 as described above. In this particular assembly 150, the first member consists of a vertically arranged post 32 having a pair of side plates 34 attached at points 33 and 35 by means of bolting arrangements including bolts, washers and nuts. The plates 34 extend vertically upward from the post 32 to an upper end 37. The second member in the davit assembly 150 is a longitudinal support member 38 extending upward and out to one side of the post 32 and side plates 34. The support member 38 is connected to the side plates 34 at an attachment point 36 near the upper end 37 of the plates by a bolting arrangement that will resist moments about that point. The support member 38 is arranged to support a load (not shown) at a loading point 42 near a distal end 43 opposite the plates 34 and post 32 by means of a U-bracket 44. The overload indicator 10 is mounted between the support member 38 and the side plates 34 such that the side 23 from which the slots 24 extend into the indicator 10 is to face upward toward the support member 38 and side plates 34. The overload indicator 10 is attached to the side plates 34 at a first connection point 41 by bolting arrangements including appropriate spacers. The indicator 10 is attached to the support member 38 at a second connection point 45 on brackets 40 provided on the support member 38, again by bolting arrangements. Bolting arrangements and other suitable fastening means are well known to those of skill in the art, and therefore not described in detail.

Arranged as described above, the overload indicator 10 will bow under overloading conditions, tending to go from the shape shown in FIG. 1 to that shown in FIG. 2. This bowing or bending action first serves as an indicator that the apparatus 100 has been overloaded. As mentioned previously, the davit assembly 150 of FIG. 6 is arranged such that the support member 38 from which the load is suspended extends upwardly, defining an angle between the support member 38 and side plates 34 greater than 90 degrees. In such an arrangement, the indicator 10 will not act to reduce the effect of overloading on the other assembly components unless it is overloaded enough to bend to an extent such that the angle between the support member 38 and the side plates 34 is reduced to 90 degrees or less. This is due to the fact that the moment exerted about the attachment point 36 is greatest when the support member 38 and side plates 34 are at right angles to each other. So preliminary bending causing the angle between the support member 38 and the plates 34 to decrease from the original angle to 90 degrees will only serve to indicate to a user that the apparatus has been overloaded, while further bending will decrease the magnitude of the moment created about the attachment point 37 by the load, thereby increasing the assembly's ability to support it.

FIG. 7 illustrates the use of a second embodiment of the present invention, generally indicated at 50, in an alternate mounting arrangement. A load supporting apparatus 200, similar to the one illustrated in FIGS. 1 and 2, features a first member 2 extending upward and having a second member 4 supported at the upper end and extending outward to one side. The two members are connected at an attachment point 6 featuring suitable fastening means that will resist moments of limited magnitude about that point. The alternate mounting arrangement for the overload indicator 50 consists of mounting elements 56 which support the overload indicator 50 between them. Each mounting element is angularly attached to one of the two members and extends toward the other mounting element. The element 56 on the first member 2 is attached at a point downward from the second member 4 while the element 56 on the second member is located between the load 8 and the first member 2. In this arrangement, the overload indicator in combination with the mounting elements 56 further support the second member 4 relative to the first member 2.

The second embodiment of the overload indicator 50 works under the same principles as the first but bends only over the distance between the mounting elements 56 rather than the distance between the first 2 and second members 4. FIG. 8 shows the apparatus 200 with a bent overload indicator 50 resulting from overloading. FIG. 9 shows a closer view of the mounting arrangement shown in FIGS. 7 and 8. The mounting elements 56 are hollow such that each element may receive a respective end portion 60 of the overload indicator 50 therein. The bending of the overload indicator occurs only in the bendable portion 58 between the end portions 60. The end portions are rigid and remain straight, substantially aligned with the mounting elements 56 in which they are housed.

FIG. 10 shows the second embodiment of the overload indicator 50 in greater detail. Like in the first embodiment, the overload indicator 10 is made of a longitudinal member 12 having a U-shaped cross section with a central portion 18 extending perpendicularly between parallel side portions 20. Between opposite ends 14 and 16, the longitudinal member 50 has a series of slots 24 extending from a side 23 opposite the central portion 18 toward the central portion 18 in each side portion 20. These slots 24 define teeth 22, each of which is positioned between two adjacent slots 24. Like the first embodiment the slots are arranged to induce concave bending along the side 23 of the longitudinal member 12 from which the slots 24 extend into the side portions 20 during longitudinal loading beyond a predetermined limit chosen for a particular application.

In this second embodiment, the series of slots 24 does not extend as far towards each of the ends 14 and 16 of the longitudinal member 12. This arrangement creates the rigid end portions 60 that are housed within the hollow mounting elements 56 as discussed above. Instead of a pair of aligned holes in the side portions at each end, the second embodiment features a pair of holes 54 extending through the central portion 18 of the longitudinal member 12 at each of the ends 14 and 16. The holes 54 of each pair are spaced apart along a central axis of the central portion 18, which is illustrated by broken line A-A in FIG. 13. Each hole is aligned with a lock nut 52 positioned on the central portion 18 between the side portions 20. This allows the overload indicator 50 to be bolted into position from outside the mounting elements 56 by means of holes (not shown) in the mounting elements 56 that are spaced to align with those in the overload indicator 50. In addition to the lack of slots 24, the end portions 60 of the overload indicator 50 are further restricted from bending by the pairing of these fasteners at each end.

With the holes 54 and nuts 52 of the overload indicator 50 being situated at the central portion 18 of the longitudinal member 12, the orientation of the overload indicator 50 within the mounting elements 56 will determine whether it bends toward or away from the members 2 and 4 of the apparatus 200. Inserting the bolts 61 from above, as shown in FIG. 9, will position the side 23 with the slots 24 downward, resulting in bending toward the members as shown in FIG. 8.

Figure 14:
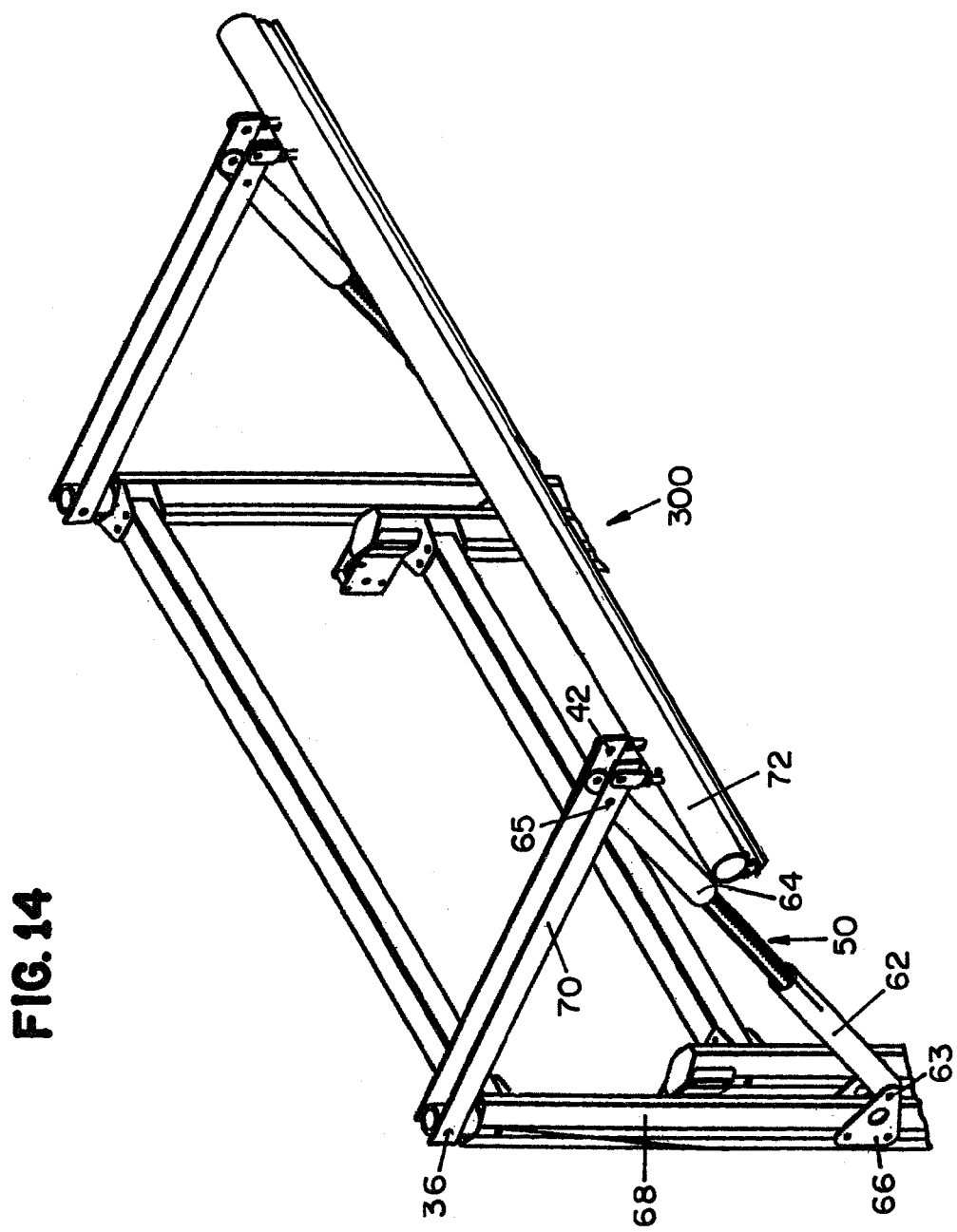
FIG. 14 is an isometric view of a portion of a fall protection system featuring an overload indicator according to the second embodiment of the present invention.

FIG. 14 illustrates a portion of a rail system 300 for use in fall protection featuring the second embodiment of the present invention. At each end of the system 300, the first member consists of a vertical post 68 having a cylindrical mounting element 62 supported on it by means of a pair of brackets 66, to which the cylindrical mounting element 62 is operatively connected proximate a connection point 63. The second member is a longitudinal support member consisting of a pair of side plates 70 having another cylindrical mounting element 64 supported between the plates 70 and operatively connected thereto proximate a connection point 65 and a loading point 42. The members at each end support a rigid rail 72 from which a worker can be suspended in case of a fall from an elevated work surface, With the overload indicator 50 installed as described above, if the rail system 300 is overloaded, perhaps due to attempted use of the system for applications other than fall protection where higher loads are involved, bending of the indicator 50 will warn users that the system 300 is overloaded and will reduce the moment created about the attachment point 36 by lowering the rail 72 arcuately toward the vertical post 68.

The overload indicator is to be sold as part of a load supporting apparatus and as a replacement part. That way when an indicator has been bent due to overloading of an apparatus, a replacement indicator can be purchased to replace it so that the apparatus can be reset to its original arrangement and used again without incurring significant cost. Aside from the overload indicator, and possibly fastening means for connecting components of the apparatus, no other major components will require replacement.

While the above embodiments have been outlined in the context of load supporting systems having a generally vertical member and a generally horizontal load supporting member extending outward from an elevated position on the vertical member, it should be realized that the present invention should not be limited to such arrangements. The shape, arrangement and means of attaching the components of a load supporting apparatus can be easily modified by those of skill in the art while still making use of a bending member to indicate overloading and prevent the failure of other components of the apparatus. The overload indicator can be mounted or adapted in a variety of ways to suit a number of applications. The invention would be useful in situations where it is desirable to visually indicate the application of an excessive force and/or allow limited relative movement of components of a load bearing system during excessive loading.

The loading limit at which the indicator begins to bend can be adjusted by modifying the physical characteristics of the indicator, such as the slot size, slot spacing and material. As such, it should be noted that the term "excessive" is used to describe a magnitude that is considered to be so in regards to the application for which the apparatus using the overload indicator is intended.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for supporting a load, said apparatus comprising:
   a first member having a first connection point thereon;
   a second member having a second connection point thereon, said second member having a connector configured and arranged to support the load and said second member being supported on the first member; and
   an overload indicator comprising a longitudinal member having opposite ends spaced apart by a first distance, said overload indicator extending between the first and second connection points, thereby supporting the second member on the first member, said longitudinal member having a weakened portion between the opposite ends, the weakened portion being bendable;
   the connection points being points being spaced apart by a second distance;
   the apparatus having a load limit;
   the longitudinal member of the overload indicator bending proximate the weakened portion if the load exceeds the load limit of the apparatus such that the first distance between the opposite ends of said longitudinal member is decreased, thereby visually indicating overloading of the apparatus; and
   the second member moving during bending of the longitudinal member of the overload indicator such that the second distance between the first and second connection points is decreased.

2. The apparatus according to claim 1 wherein the first member comprises a post extending upwardly from a lower end, the first connection point being upwardly spaced from said lower end.

3. The apparatus according to claim 1 wherein the second member comprises a longitudinal support member supported on the post upward from the first connection point and extending to one side of said post.

4. The apparatus according to claim 3 wherein the load is supported by the connector on the longitudinal support member at a loading point distally spaced from the post.

5. The apparatus according to claim 4 wherein the second connection point is located between the post and the loading point.

6. The apparatus according to claim 5 wherein the first member further comprises a first mounting element supported on the post and extending toward the second connection point, the first connection point being located on said first mounting element.

7. The apparatus according to claim 6 wherein the second member further comprises a second mounting element supported on the longitudinal support member and extending toward the first connection point, the second connection point being located on the second mounting element such that the overload indicator is supported between said first and second mounting elements.

8. The apparatus according to claim 1 wherein the overload indicator further comprises a plurality of slots spaced along the longitudinal member between the opposite ends thereof, said slots extending into said longitudinal member from a first side thereof.

9. The apparatus according to claim 8 wherein the longitudinal member comprises a U-shaped cross section defining a central portion separating two spaced apart side portions, said side portions extending from the central portion toward the first side of the longitudinal member such that the plurality of slots are spaced along and extend into each of said side portions.

10. The apparatus according to claim 9 wherein the slots in the side portions of the longitudinal member do not extend to the central section thereof.

11. The apparatus according to claim 1 wherein the opposite ends are rigid end portions and the weakened portion is a weaker portion between the rigid end portions, the weaker portion bending if the load exceeds the load limit of the apparatus.

12. The apparatus according to claim 1 wherein the weakened portion includes a plurality of slots in the longitudinal member.

13. The apparatus according to claim 1 wherein the weakened portion includes a weaker portion between the opposite ends of the longitudinal member.

14. An apparatus for supporting a load, said apparatus comprising:
a first member having a first connection point thereon;
a second member having a second connection point thereon, said second member having a connector configured and arranged to support the load and said second member being supported on the first member; and
an overload indicator comprising:
a longitudinal member having opposite ends spaced apart by a first distance; and
a plurality of slots spaced along the longitudinal member between the opposite ends thereof, said slots extending into said longitudinal member from a first side thereof;
said overload indicator extending between the first and second connection points, thereby supporting the second member on the first member;
the connection points being points being spaced apart by a second distance;
the slots of the overload indicator provide a bendable portion that allows the longitudinal member of said overload indicator to bend concavely with respect to the first side thereof during overloading of the apparatus such that the first distance between the opposite ends of said longitudinal member is decreased; and
the second member moving during bending of the longitudinal member of the overload indicator such that the second distance between the first and second reference points is decreased.

15. The apparatus according to claim 14 wherein the longitudinal member comprises a U-shaped cross section defining a central portion separating two spaced apart side portions, said side portions extending from the central portion toward the first side of the longitudinal member such that the plurality of slots are spaced along and extend into each of said side portions.

16. The apparatus according to claim 15 wherein the slots in the side portions of the longitudinal member do not extend to the central section thereof.

17. The apparatus according to claim 14 wherein the first member comprises a post extending upwardly from a lower end, the first connection point being upwardly spaced from said lower end.

18. The apparatus according to claim 17 wherein the second member comprises a longitudinal support member supported on the post upward from the first connection point and extending to one side of said post.

19. The apparatus according to claim 18 wherein the load is supported by the connector on the longitudinal support member at a loading point distally space from the post.

20. The apparatus according to claim 19 wherein the second connection point is located between the post and the loading point.

21. The apparatus according to claim 20 wherein the first member further comprises a first mounting element supported on the post and extending toward the second connection point, the first connection point being located on said first mounting element.

22. The apparatus according to claim 21 wherein the second member further comprises a second mounting element supported on the longitudinal support member and extending toward the first connection point, the second connection point being located on the second mounting element such that the overload indicator is supported between said first and second mounting elements.

23. The apparatus according to claim 14 wherein the bendable portion is a weakened portion of the longitudinal member.

24. An apparatus for supporting a load, said apparatus comprising:
a first member having a first connection point thereon;
a second member having a second connection point thereon, said second member having a connector configured and arranged to support the load and said second member being supported on the first member;
a longitudinal channel member having opposite ends spaced apart and a U-shaped cross section defining opposite side portions spaced apart by a central portion, the longitudinal channel member extending between the first and second connection points, thereby supporting the second member on the first member; and
a plurality of slots spaced along each side portion of the longitudinal channel member between the opposite ends thereof, said slots extending into said side portions from a first side of said longitudinal channel member, said first side being opposite the central portion;
the slots being arranged such that each slot has a respective slot on the opposite side portion that is generally equal in dimensions and is equally positioned along the longitudinal channel member; and
each slot being of a length such that a distance is defined between said slot and the central portion of the longitudinal channel member, the slots providing a bendable portion between the opposite ends of the longitudinal channel member, the bendable portion bending when subjected to a load exceeding a load limit of the longitudinal channel member.

25. The apparatus according to claim 24 wherein the bendable portion is a weakened portion of the longitudinal member.

* * * * *